US011275779B2

(12) United States Patent
Srinivasaraghavan et al.

(10) Patent No.: US 11,275,779 B2
(45) Date of Patent: Mar. 15, 2022

(54) MEDIA CONTENT RECOMMENDATION AND USER INTERFACE GENERATION

(71) Applicant: Verizon Patent and Licensing Inc., Basking Ridge, NJ (US)

(72) Inventors: Haripriya Srinivasaraghavan, Plano, TX (US); Senthil K. Raghavan, Coppell, TX (US); Praveen Kumar Bandaru, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/928,395

(22) Filed: Jul. 14, 2020

(65) Prior Publication Data
US 2020/0342020 A1    Oct. 29, 2020

Related U.S. Application Data

(63) Continuation of application No. 16/052,255, filed on Aug. 1, 2018, now Pat. No. 10,747,803.

(51) Int. Cl.
*G06F 16/438* (2019.01)
*G06F 16/435* (2019.01)
(Continued)

(52) U.S. Cl.
CPC .......... *G06F 16/438* (2019.01); *G06F 3/0482* (2013.01); *G06F 16/285* (2019.01); *G06F 16/435* (2019.01); *G06Q 30/0631* (2013.01)

(58) Field of Classification Search
CPC .... G06F 16/438; G06F 16/435; G06F 16/285; G06F 3/0482; G06Q 30/0631
See application file for complete search history.

(56) References Cited

U.S. PATENT DOCUMENTS 7,249,067 B2    7/2007   Doerksen et al.
8,098,390 B1 *  1/2012   Yacoub .............. G06Q 30/0241
                                                   358/1.15
(Continued)

OTHER PUBLICATIONS

Best Practices for Securing E-Commerce Special Interest Group and PCI Security Standards Council, "PCI Data Security Standard", published in Apr. 2017, retrieved on Jul. 30, 2021 from https://www.pcisecuritystandards.org/pdfs/best_practices_securing_ecommerce.pdf (Year: 2017).*

(Continued)

*Primary Examiner* — Shourjo Dasgupta

(57) ABSTRACT

A method, a device, and a non-transitory storage medium for determining, based on media content selection activity of a user for a media content inventory, the user's sensitivity to a cost and to a relevance of the media content; assigning a cost value to respective media content items based on user-specific content cost information from media content providers; assigning a relevance value to the respective media content items based on user-specific content relevancy information associated with the respective media content items; ranking the media content items based on: the user's sensitivity to the cost of the media content relative to the cost values for the respective media content items, and the user's sensitivity to the relevance of the media content relative to the relevance values for the respective media content items; and presenting, via a personalized media content recommendation interface, an ordering of the media content items based on the ranking.

20 Claims, 11 Drawing Sheets

(51) Int. Cl.
*G06F 16/28* (2019.01)
*G06Q 30/06* (2012.01)
*G06F 3/0482* (2013.01)

(56) References Cited

U.S. PATENT DOCUMENTS

| | | | | |
|---|---|---|---|---|
| 9,195,758 | B2* | 11/2015 | Parikh | G06F 16/9535 |
| 2002/0082952 | A1 | 6/2002 | Johnston | |
| 2003/0132298 | A1 | 7/2003 | Swartz et al. | |
| 2004/0064832 | A1 | 4/2004 | Tsukidate et al. | |
| 2005/0160014 | A1* | 7/2005 | Moss | G06Q 30/00 |
| | | | | 705/26.61 |
| 2008/0147635 | A1* | 6/2008 | Im | G06F 16/951 |
| 2008/0256064 | A1* | 10/2008 | Grois | G06Q 30/04 |
| 2009/0178081 | A1 | 7/2009 | Goldenberg et al. | |
| 2013/0191401 | A1* | 7/2013 | Xia | G06F 16/71 |
| | | | | 707/751 |
| 2014/0207620 | A1* | 7/2014 | Nickerson | G06Q 30/0623 |
| | | | | 705/26.61 |
| 2015/0112826 | A1* | 4/2015 | Crutchfield, Jr. | G06Q 30/0601 |
| | | | | 705/26.1 |
| 2015/0127491 | A1* | 5/2015 | Duggar | G06Q 30/0625 |
| | | | | 705/26.62 |
| 2016/0034937 | A1* | 2/2016 | Nickerson | G06Q 30/0214 |
| | | | | 705/14.16 |
| 2016/0050446 | A1 | 2/2016 | Fujioka et al. | |
| 2016/0148236 | A1* | 5/2016 | Evdokimo | G06Q 30/08 |
| | | | | 705/26.3 |
| 2016/0210602 | A1* | 7/2016 | Siddique | G06Q 20/204 |
| 2016/0253733 | A1* | 9/2016 | Sondhi | G06F 16/951 |
| | | | | 705/26.62 |
| 2017/0171580 | A1 | 6/2017 | Hirsch et al. | |
| 2017/0193584 | A1* | 7/2017 | Narasimhan | G06Q 30/0243 |
| 2017/0287044 | A1 | 10/2017 | Rose et al. | |
| 2017/0318350 | A1 | 11/2017 | Wielgosz | |
| 2018/0357289 | A1 | 12/2018 | Wittke | |
| 2019/0043084 | A1 | 2/2019 | Litvak | |

OTHER PUBLICATIONS

Mengting Wan et al, "Modeling Consumer Preferences and Price Sensitivities from Large-Scale Grocery Shopping Transaction Logs", published in WWW 2017, Apr. 2017, Perth, Australia, retrieved from https://cseweb.ucsd.edu/~jmcauley/pdfs/www17.pdf, retrieved Nov. 8, 2021 (Year: 2017).*

Eliot P. Brenner et al, "End-to-End Neural Ranking for eCommerce Product Search", published in SIGIR 2018 eCom, Jul. 2018, Ann Arbor, Michigan, USA, retrieved from https://sigir-ecom.github.io/ecom2018/ecom18Papers/paper16/pdf, retrieved Nov. 8, 2021 (Year: 2018).*

"How to Use the Price Quality Matrix to Optimize Your Product Pricing", published on Sep. 16, 2016 to https://www.intelligencenode.com/blog/use-price-quality-matrix-optimize-product-pricing, retrieved Nov. 8, 2021 (Year: 2016).*

Albari, Indah Safitri, "The Influence of Product Price on Consumers' Purchasing Decisions", published in 2018 in Review of Integrative Business and Economics Research, vol. 7, Supplementary Issue 2, retrieved Nov. 8, 2021 (Year: 2018).*

"Three Great Methods to Determine Price Acceptance", published on Jun. 2, 2018 to https://www.quantilope.com/en/blog/whitepaper-three-great-methods-to-determine-price-acceptance, retrieved Nov. 8, 2021 (Year: 2018).*

Jung Eun Lee, Jessie H. Chen-Yu, "Effects of price discount on consumers/ perceptions of savings, quality, and value for apparel products: mediating effect of price discount affect", published in 2018 in Fashion and Textiles 5:13, retrieved Nov. 8, 2021 (Year: 2018).*

"4 Factors That Influence Price Sensitivity of Customers", published on Aug. 16, 2017 to https://blog.pricebeam.com/4-factors-that-influence-price-sensitivity-of-customers, retrieved Nov. 8, 2021 (Year: 2017).*

Dosterhuis, et al., "Ranking for Relevance and Display Preferences in Complex Presentation Layouts", Jul. 8-12, 2018, SIGIR '18: The 41st International ACM SIGIR Conference on Research & Development in Information Retrieval, Ann Arbor, MI, USA. (Year: 2018).

* cited by examiner

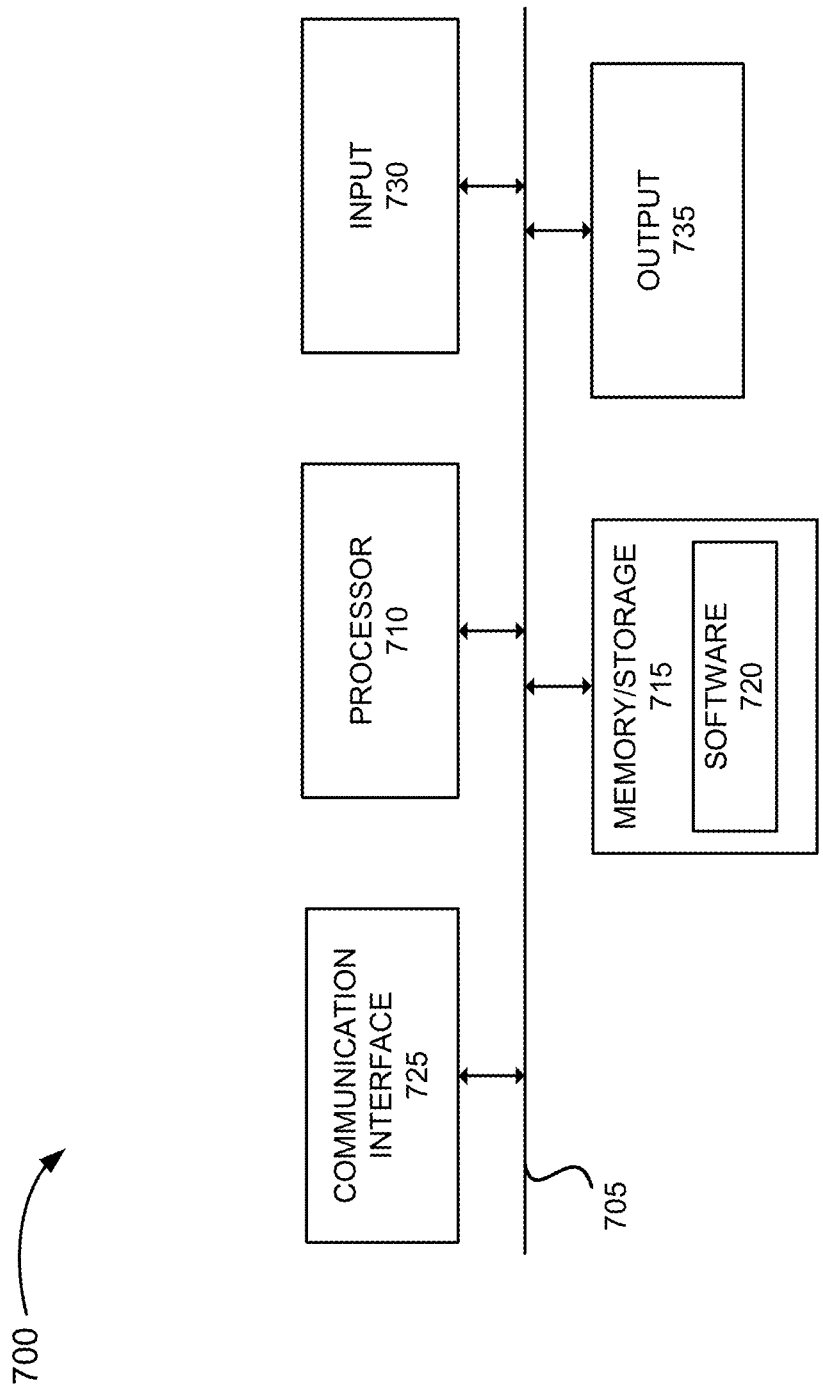

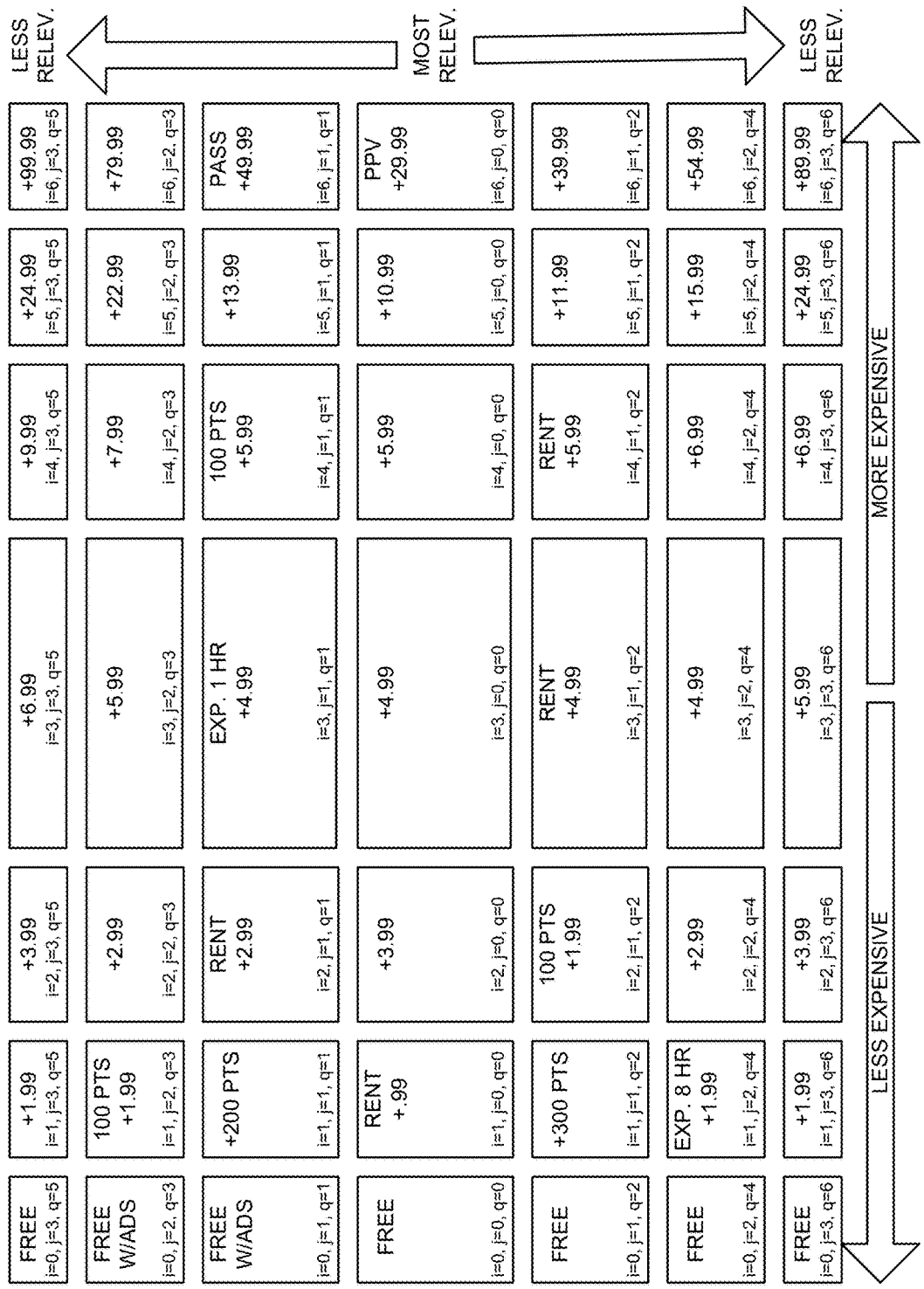

MEDIA CONTENT RECOMMENDATION AND USER INTERFACE GENERATION

CROSS REFERENCE TO RELATED APPLICATION

This patent application is a continuation of U.S. patent application Ser. No. 16/052,255 filed on Aug. 1, 2018, the disclosure of which is incorporated by reference herein in its entirety.

BACKGROUND

Content networks maintain various network devices that store digital media content ("titles," "programs," or "items") and corresponding aggregated metadata (e.g., catalogs, indexes, etc.) which are used to generate user-specific content offerings. For example, a content service may use search, selection, and recommendation systems that filter, identify, and suggest media content that is potentially of interest to a user based on, for example, the user's history of content selection/consumption.

BRIEF DESCRIPTION OF THE DRAWINGS

FIGS. 3-6A are diagrams illustrating an exemplary process of the personalized content recommendation interface;

FIG. 7 is a diagram illustrating exemplary components of a device that may correspond to one or more of the devices illustrated and described herein;

FIG. 9 is a diagram illustrating an exemplary grid array of titles.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Today's consumer of digital media content is faced with the time-consuming task of sifting through an expansive universe of media content that is available for consumption ("content space") at many different terms of offering (e.g., free, subscription-based, ad-sponsored, pay-per-view, purchasable, for rent, etc.) and from multiple content providers. Intelligent content recommendation technology—designed to automatically condense the content space on a per-user basis—has not kept pace with advances in media content generation/delivery capabilities. Existing content recommendation systems, for example, do not account for dynamic pricing models, such as temporary price reductions, reward points schemes, sponsored options, introductory offers, discount sales, premium pricing, etc., which are implemented by many content providers and service providers. In this regard, existing content recommendation systems may inefficiently use network resources by way of generating less-than-optimal content recommendations for users. Further, network resources may be also unproductively used to present the sub-optimal content recommendation to the users, which may result in extended browsing sessions and lower user selections rates. Consequently, the individual user experience would be improved, and the overall consumption of media content increased, in response to technology-based solutions for more efficiently-performing content offering selection and presentation systems.

Figure 1A:
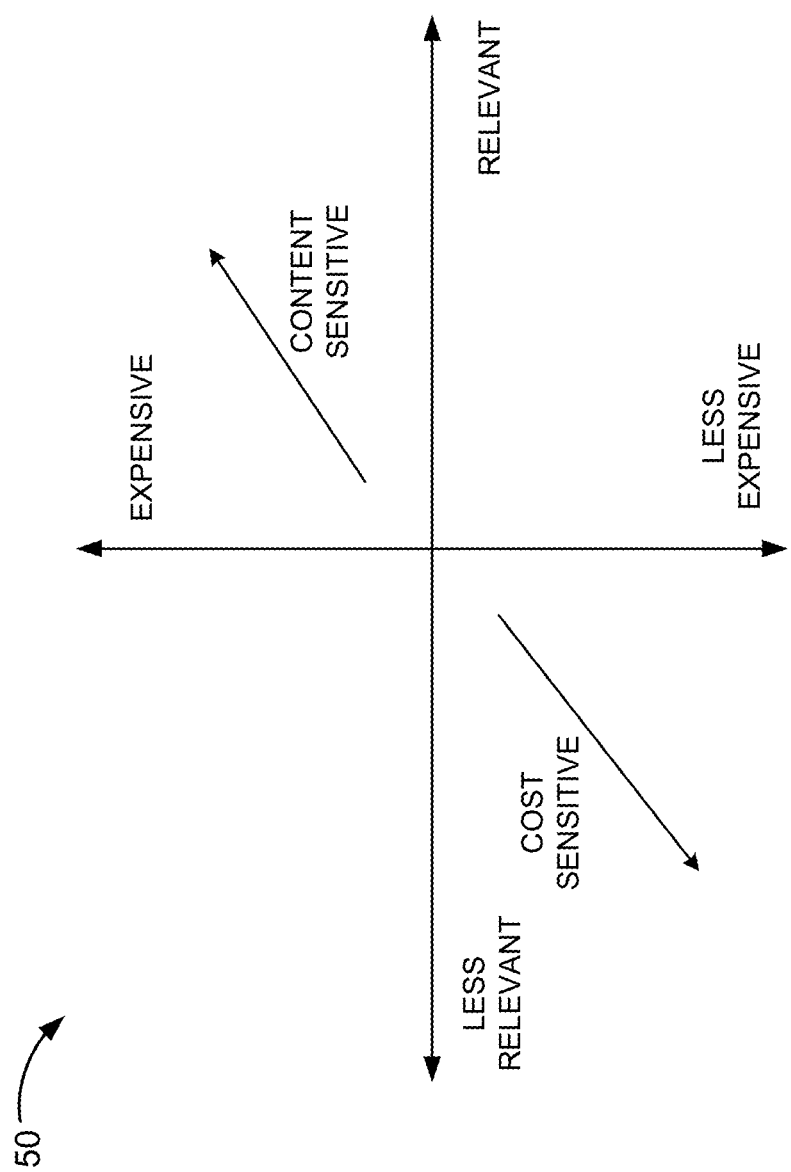
FIG. 1A is a diagram illustrating a conceptual content space.

According to exemplary embodiments, a personalized content recommendation interface is described. For example, the personalized content recommendation interface is provided by a content recommendation system that includes logic to select cataloged content items from a content space based on a user's observed sensitivity to content relevance and associated cost. FIG. 1A illustrates a conceptual representation of an exemplary content space 50 as a function of contents' determined relevance and associated cost. Content space 50 indicates a generalized (e.g., countervailing) relationship with respect to users' sensitivity to content cost and content relevance. That is, content space 50 indicates the tendency on the part of users to tolerate an increase in cost in exchange for content items of increasing interest to the users.

According to an exemplary embodiment, the recommendation system provides the personalized content recommendation interface based on user-specific content preferences and cost tolerances. According to such an embodiment, the content recommendation system uses content metadata, dynamic pricing models, and a learned cost-content sensitivity index (CCSI or "$\beta$"). The CCSI may indicate the degree to which a particular user is cost sensitive versus content sensitive with respect to a particular content item. The CCSI for a particular content item may vary with respect to, for example, different genres of content, a time of day, a day of the week and/or a time of the year associated with consumption of the particular content item. In some embodiments, the CCSI may be a normalized number, e.g., 1, where when $\beta=0$, the user is totally cost sensitive; when $\beta=1$, the user is totally content sensitive; and when $\beta=0.5$, the user is equally cost sensitive and content sensitive. Given the interactive nature between the user and the content recommendation system that occurs, the user's CCSI for a given content item may change over time. According to an exemplary embodiment, the content recommendation system redefines and orders the content space based on multiple parameter values, as described herein.

According to another exemplary embodiment, the content recommendation system provides the personalized content recommendation interface based on the CCSI and a multi-objective function, cost-content tradeoff score (CCTS). According to such an exemplary embodiment, the content recommendation system uses the CCSI and the CCTS to create a grid array G by identifying the top k candidate titles and configuring an n×m grid (where n and m are positive integers that may differ or be the same). The k titles may be organized in n or m offering "bands." The titles may be arranged in the grid based on the terms of the offerings and relevancy values determined for each title. According to an exemplary embodiment, the described content recommendation system narrows the content space based on one or multiple parameter values, as described herein.

In view of the foregoing, the personalized content recommendation interface may improve content offerings by limiting the scope of a content space using prescribed functions to feature content of prime interest to a user at optimal offering terms, as described herein. For example, the content recommendation system searches, identifies, and recommends contents that represent the top content titles given a user's sensitivity to content relevancy and cost. Consequently, network resources that are used to generate the content offerings may be reduced relative to existing content recommendation systems. Additionally, the personalized content recommendation interface may reduce overall recommendation times, reduce utilization of processing resources (e.g., processor, memory, etc.), and present select content items to a user for consideration and selection more efficiently and/or accurately over time than existing recommendation systems, thereby improving the user experience and minimizing network resource usage.

Figure 1B:
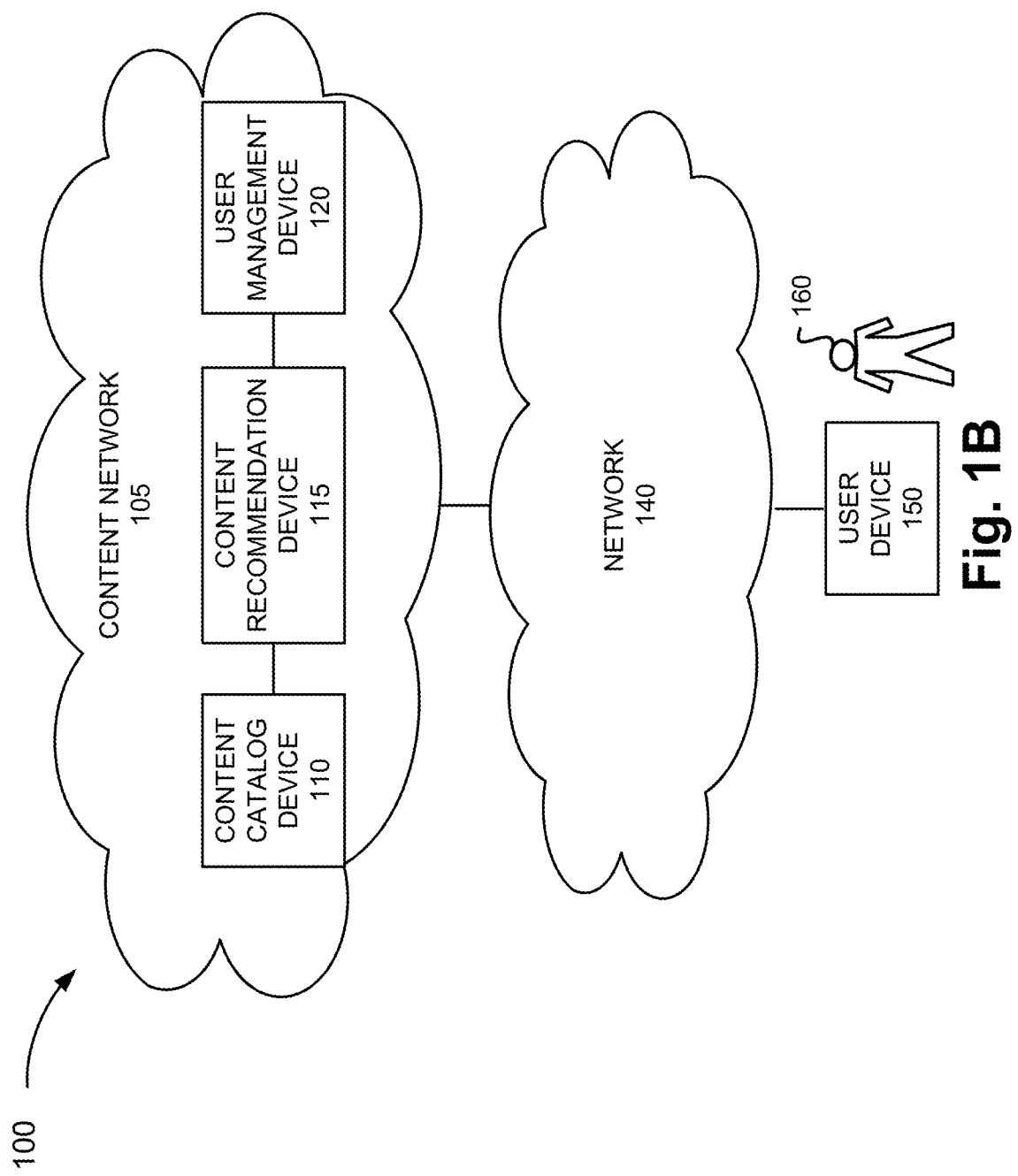
FIG. 1B is a diagram illustrating an exemplary environment in which exemplary embodiments of a personalized content recommendation interface may be implemented.

FIG. 1B is a diagram illustrating an exemplary environment 100 in which an exemplary embodiment of the personalized content recommendation interface may be implemented. As illustrated, environment 100 includes a content network 105 and a network 140. Content network 105 may include a content catalog device 110, a content recommendation device 115, and a user management device 120. According to other embodiments, environment 100 may include additional networks, fewer networks, and/or different types of networks than those illustrated and described herein. Environment 100 also includes an end device 150 that may be operated by a user 160.

The number and arrangement of network devices in content network 105, and the number of end devices 150 are exemplary. According to other embodiments, environment 100 may include additional devices, fewer devices, and/or differently arranged devices, than those illustrated in FIG. 1B. For example, a single device in FIG. 1B may be implemented as multiple devices and/or multiple devices may be implemented as a single device. A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). The number and the type of network devices illustrated in environment 100 are exemplary.

Environment 100 includes communication links between the networks and communication links between the network devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1B. The number and the arrangement of communication links illustrated in environment 100 are exemplary.

Content network 105 includes a network that provides access to and use of a content service. Generally, content network 105 may be implemented as a satellite-based network, a terrestrial-based network, or a combination thereof. Content network 105 may be implemented to distribute contents using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, content network 105 may include various types of network devices that contribute to the access and use of the content service by users.

According to an exemplary embodiment, content network 105 includes network devices that provide the personalized content recommendation interface, as described herein. According to an exemplary embodiment, the personalized content recommendation interface is provided based on content catalog device 110, content recommendation device 115, and user management device 120.

Content catalog device 110 includes a network device that stores and manages cataloged metadata of titles of media content. According to an exemplary embodiment, the media content may be audio and visual contents, such as, for example, movies, television shows, and the like. According to other exemplary embodiments, content titles may include audio content, such as, for example, music, and/or other forms of content (e.g., text, multimedia, etc.). Content catalog device 110 may be implemented to include a mass storage device. Content catalog device 110 may include logic that provides various storage-related functions, such as, add, delete, update, etc., the metadata. Content catalog device 110 may include logic that performs a query process. For example, content catalog device 110 may receive a query request from content recommendation device 115, generate a query response, and transmit the response to content recommendation device 115. According to other exemplary embodiments, content catalog device 110 may not include logic that performs the query process.

The metadata may include, for example, data indicating a title of a content, a genre and/or a sub-genre of the content, cast and crew information, storyline information (e.g., plot summary, synopsis, tagline, etc.), a movie rating or a television rating (e.g., R, PG-13, TV 14, etc.), a date of release, a language, a runtime, a video format (e.g., 4K, HD, 3D, etc.), an audio format (e.g., stereo, Dolby Surround 7.1, etc.), filming location information, company credit information (e.g., production company, distributor, etc.), rating (e.g., user, critic, etc.), review (e.g., user, critic, etc.) and/or other information that pertain to the content (e.g., an image, a video trailer, web site address, etc.). In one embodiment, the metadata may include associated cost information for the content titles. According to other exemplary embodiments, content catalog device 110 may store the metadata in various types of data structures or mass storage information entities (e.g., a database, etc.). A further description of the metadata is described below.

Content recommendation device 115 includes a network device that manages the personalized content recommendation interface. Content recommendation device 115 includes logic that performs user interface configuration and/or recommendation of titles based on the information stored in content catalog device 110, user management device 120, and user device 150, and/or user interaction by user 160 (e.g., selecting/not selecting titles). According to an exemplary embodiment, content recommendation device 115 provides a user interface (e.g., graphical user interface (GUI)) that obtains user information (e.g., from user device 150) and provides candidate content items to user 160 with or without a specific request from user 160. According to various exemplary embodiments, content recommendation device 115 includes logic that provides content relevance/pricing sensitivity-based ranking and/or ordering of titles of content via the personalized content recommendation interface to user device 150.

According to an exemplary embodiment of the personalized content recommendation interface, content recommendation device 115 includes logic that provides a content offering value (COV) and content relevancy value (CRV) for each title with respect to user 160. In one implementation, the logic may assign a COV that is a normalized number (e.g., 0.0-1.0) corresponding to a price at which each title may be offered to user 160. In cases where a title is available for different prices, whether from a single source or multiple sources, the logic may assign the COV based on the lowest associated cost and/or an average associated cost, etc. In one embodiment, a COV of 0 (zero) may correspond to free and/or substantially "free" (e.g., with a user's point redemption) titles, while a COV of 1.0 may correspond to the most expensive titles (e.g., $20 and above). In this embodiment, a COV of 0.5 may correspond to titles priced in a mid-range (e.g., around $5), as determined by content recommendation device 115, and other numerical values indicative of the COV may correspond to other terms of offering along the normalized range of 0.0-1.0. In some embodiments, the normalized values corresponding to the nominal value ranges may be updated at regular and/or triggered points in time, for example, for the entire inventory of titles or a portion thereof. For some titles, the COV for a particular title may be user-specific, i.e., vary among users 160 based on, for example, applicable rewards-points schemes, limited-time offers, multi-title volumes, content service terms, geographic location, ad sponsorship, targeted incentive campaigns, etc.

In one implementation, the logic may assign a CRV that is a normalized number (e.g., 0.0-1.0) corresponding to a relevancy determined for each title that may be offered to user 160. In one embodiment, a CRV of 0 (zero) may correspond to no user interest and/or substantially no user interest titles, while a CRV of 1.0 may correspond to the titles of most interest to user 160 (e.g., "must see"). In this embodiment, a CRV of 0.5 may correspond to titles of moderate interest to user 160, as determined by content recommendation device 115, and other numerical values indicative of the COV may correspond to other terms of offering along the normalized range of 0.0-1.0. The logic may assign and/or update the CRVs to titles based on user 160's previous viewing habits and/or patterns of title consumption based on, for example, categories of genre, content type, and/or any other identified parameters.

According to an exemplary embodiment of the personalized content recommendation interface, content recommendation device 115 includes logic that uses the CRV, COV, and CCSI to optimize a particular content score for a title with respect to user 160, by calculating the CCTS according to the following exemplary expressions:

$$CCTS(COV, CRV, \beta) = (\beta * CRV) - ((1-\beta) * COV) \quad (1)$$

and, $$ARGMAX(CCTS) \quad (2)$$

According to such an exemplary implementation, where the parameters COV, CRV, and $\beta$ are normalized values in a real number range (e.g., [0.0 . . . 1.0]), the CCTS values can range from negative −1.0 to 1.0.

According to an exemplary implementation, content recommendation device 115 may generate a grid array G with a desired number of titles, n×m. Content recommendation device 115 may, based on the CCTS values calculated using eq. (1) and recommendation filters and/or search criteria, identify the top k content titles that are candidates for recommendation, where k≥n×m. According to another exemplary implementation, the logic may determine Arg-Max(k, CCTS), where COV corresponds to the CCTS value for COV_mid, where COV_mid is the median COV value. Content recommendation device 115 may include logic to center the titles in G around the content title having the optimized CCTS value, such that G((n+1)/2, (m+1)/2))=ArgMax(CCTS).

According to an exemplary embodiment of the personalized content recommendation interface, content recommendation device 115 includes logic that sorts the k titles by cost and aggregates into n or m bands (or bins) centered around COV_mid, with minimum cost range COV_min and maximum cost range COV_max. According to such implementation, each title will be within in a cost band index B[0] to B[n−1] (or B[0] to B[m−1]). The banding may be performed by dividing the bands on a logarithmic, linear, or non-linear cost scale to produce a balanced distribution in each cost band, such that there are at least n (or m) titles in each cost band, and PCV_mid is within the middle cost band.

Figure 2:
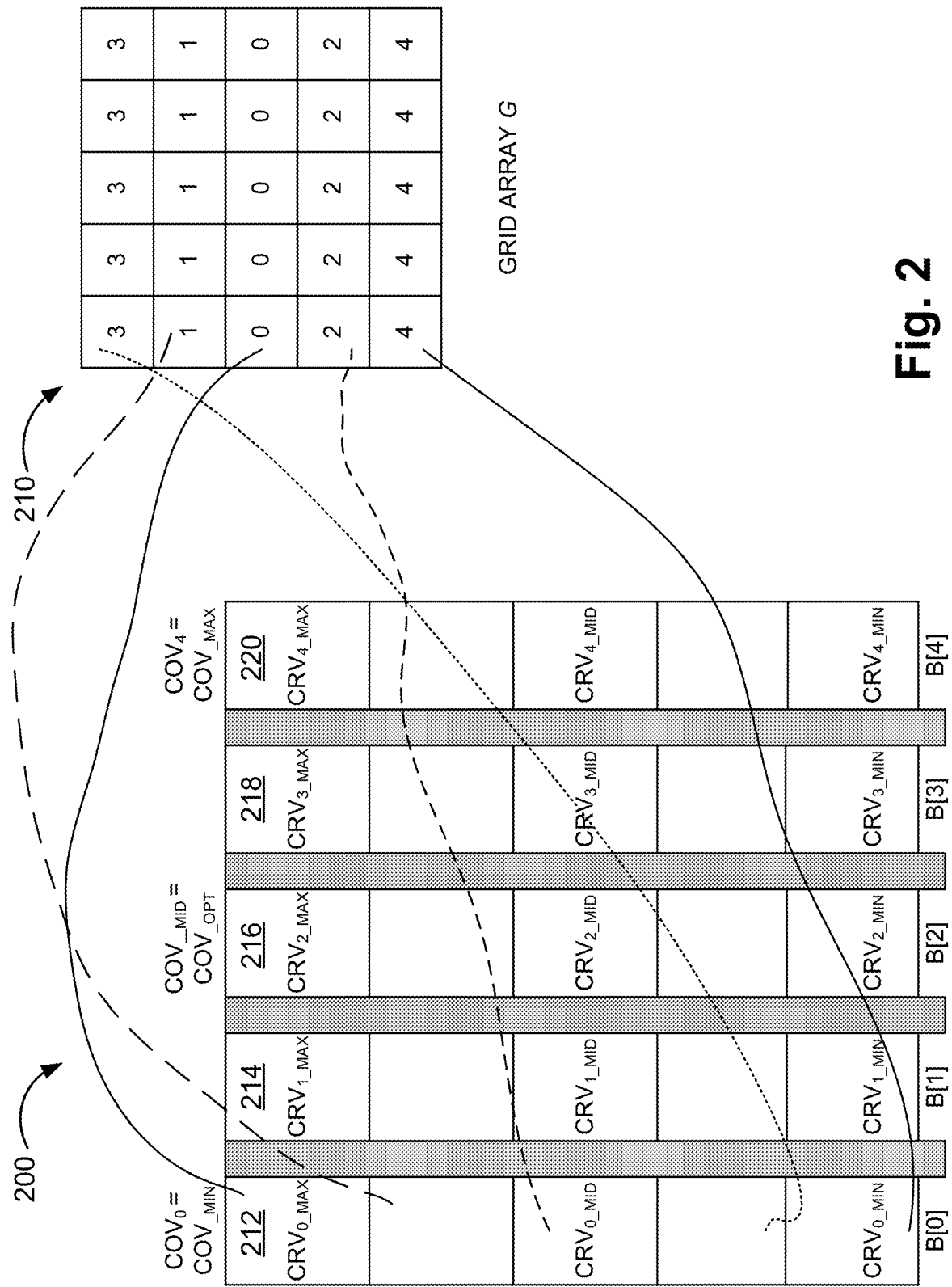
FIG. 2 is a diagram illustrating an exemplary process for generating a grid array of titles.

According to an exemplary implementation, the logic may create an ordered list of at least n (or m) titles for each cost band (B[0] to B[n−1] or B[0] to B[m−1]). In this implementation, the logic may sort, within each ordered list, the titles by descending order of content relevance score. For example, referring to FIG. 2, an exemplary implementation 200 for generating an n×n (e.g., 5×5) grid array G 210, includes assigning each title listed in cost band B[0] 212 to the first column of grid array G 210 as indicated by the corresponding lines, and so on, based on the algorithm (where the numerals 1, 2, 3, 4, 5 in grid array G 210, provided here for purposes of discussion, correspond to the ordering of the titles within each cost band B).

According to such an exemplary implementation, the least expensive (e.g., free) of the top k (e.g., ≥25) titles, $COV_0 = COV_{MIN}$, are grouped together into cost bands B[0] 212, for example, and the most expensive (e.g., $20+) titles, $COV_4 = COV_{MAX}$, are grouped together into cost band B[4] 220, while mid-range offerings (e.g., ≈$5) of content titles, $COV_{-MID} = COV_{-OPT}$, are grouped together into cost band B[2] 216, and so forth. Within each band B, the titles are ordered top-to-bottom from most relevant, $CRV_{-MAX}$, to least relevant, $CRV_{-MIN}$, while the moderately relevant, $CRV_{-MID}$, are in the middle. During placement in the grid, the content titles are placed such that the title corresponding to CRV_max is placed at the middle of the grid, the title corresponding to CRV_min is placed at the bottom row of the grid, and the other titles placed such that the titles with a higher value of CRV are closer to the center of the grid, than are titles with lower values of CRV.

Referring back to FIG. 1B, user management device 120 includes a network device that stores user profile information pertaining to users of the content service. For example, the user profile information may include COV, CRV, and CCSI information for a user, which supports the calculation of the CCTS of the personalized content recommendation interface, as described herein. The user profile information may include other types of information. For example, the user profile information may include historical information pertaining to the user, such as information pertaining to previous recommendations (e.g., offering terms, selections of candidate contents in offerings, and/or other forms of navigation tracking), and content titles consumed. The user profile information may also include user account information. The user account information may indicate a user account for accessing the content service. Additionally, for example, the user profile information may include demographic information of the user, a user identifier of the user, and user device information. For example, the user may set various parameter values pertaining to the personalized recommendation service, as described herein, and/or indicate a preference among content genres, viewing times/days.

Although not illustrated, content network 105 may include other types of network devices that provide various content services, such as a content processing device (e.g., transcoding, encryption, etc.), a digital rights management device, a licensing device, a login device (e.g., authentication, authorization, etc.), a billing device, and a content server device.

Network 140 includes one or multiple networks of one or multiple types. For example, network 140 may be implemented to include a terrestrial network, a content delivery network, a wireless network, a wired network, an optical network, a radio access network, a core network, a packet network, an Internet Protocol (IP) network, the Internet, the World Wide Web, a private network, a public network, a television distribution network, a streaming network, a mobile network, and/or other type of network that provides access to content network 105.

User device 150 includes a device that has computational and communication capabilities. User device 150 may be implemented as a mobile device, a portable device, or a stationary device. By way of further example, user device 150 may be implemented as a smartphone, a personal digital assistant, a tablet, a netbook, a phablet, a wearable device, a set-top box, an infotainment system in a vehicle, a smart television, a game system, a music playing system, a computer (e.g., a desktop, a laptop, etc.), or some other type of user device. According to various exemplary embodiments, user device 150 may be configured to execute various types of software (e.g., applications, programs, etc.). The number and the types of software may vary among user devices 150. According to an exemplary embodiment, user device 150 includes software that provides access to and/or use of the content service, which includes the personalized content recommendation interface, as described herein. For example, the software may be implemented as a browser, a mobile application, or other type of client application.

FIGS. 3-6 are diagrams illustrating an exemplary process of the personalized content recommendation interface. It may be assumed that content recommendation device 115 has obtained content metadata for a content space and user profile information of user 160.

Figure 3:
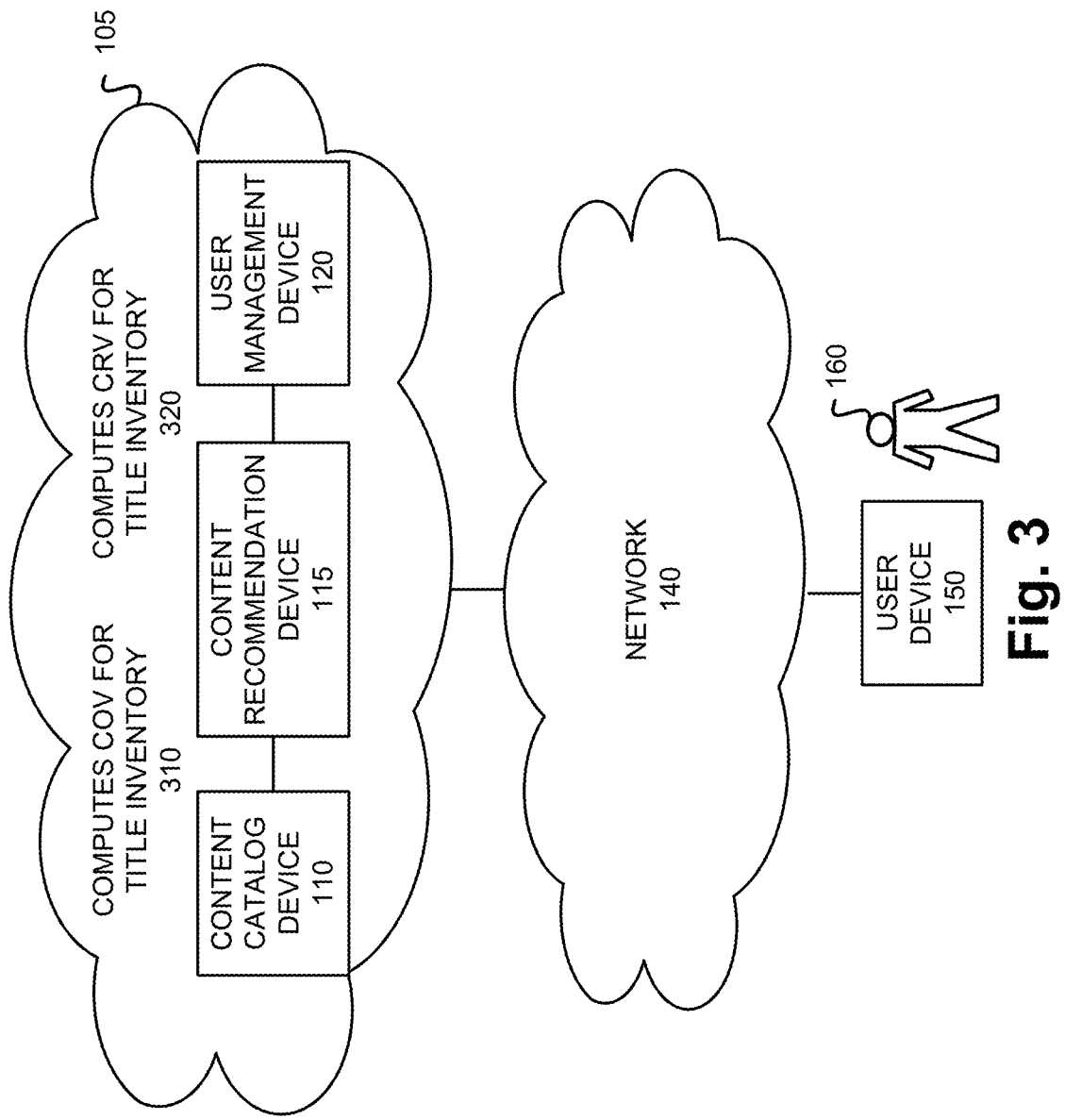

Referring to FIG. 3, content recommendation device 115 may, using the user profile and content metadata information, calculate a COV 310, and calculate a CRV 320 for content titles cataloged in one or multiple databases (e.g., Internet Movie Database (IMDB), YouTube, etc.) with respect to user 160. In one embodiment, content recommendation device 115 may use content metadata from one or multiple catalogs and user profile information regarding time-of-day/day-of-week viewing behavior, genre preferences, selection history, etc., to determine CRVs corresponding to individual content titles. In some embodiments, a single title may be assigned multiple CRVs that vary, for example, for different times of day and/or days of the week, content genres, etc. For example, a particular romantic comedy movie may be assigned one CRV that is applicable for Sunday-Thursday viewing, and a different (e.g., higher) CRV for Friday and/or Saturday viewing, based on user consumption history.

Content recommendation device 115 may use pricing information from one or multiple content providers and user profile information regarding rewards points, subscription terms, etc., to determine COVs for individual content titles. In some embodiments, a single title may have multiple COVs that vary, for example, by content providers, by service account incentives, by time of day and/or day of the week, etc. For example, a particular movie may have one COV that corresponds to "free" with sponsored ads from one content provider, and a different COV that corresponds to a nominal cost to rent with redemption of a number of rewards points.

Figure 4:
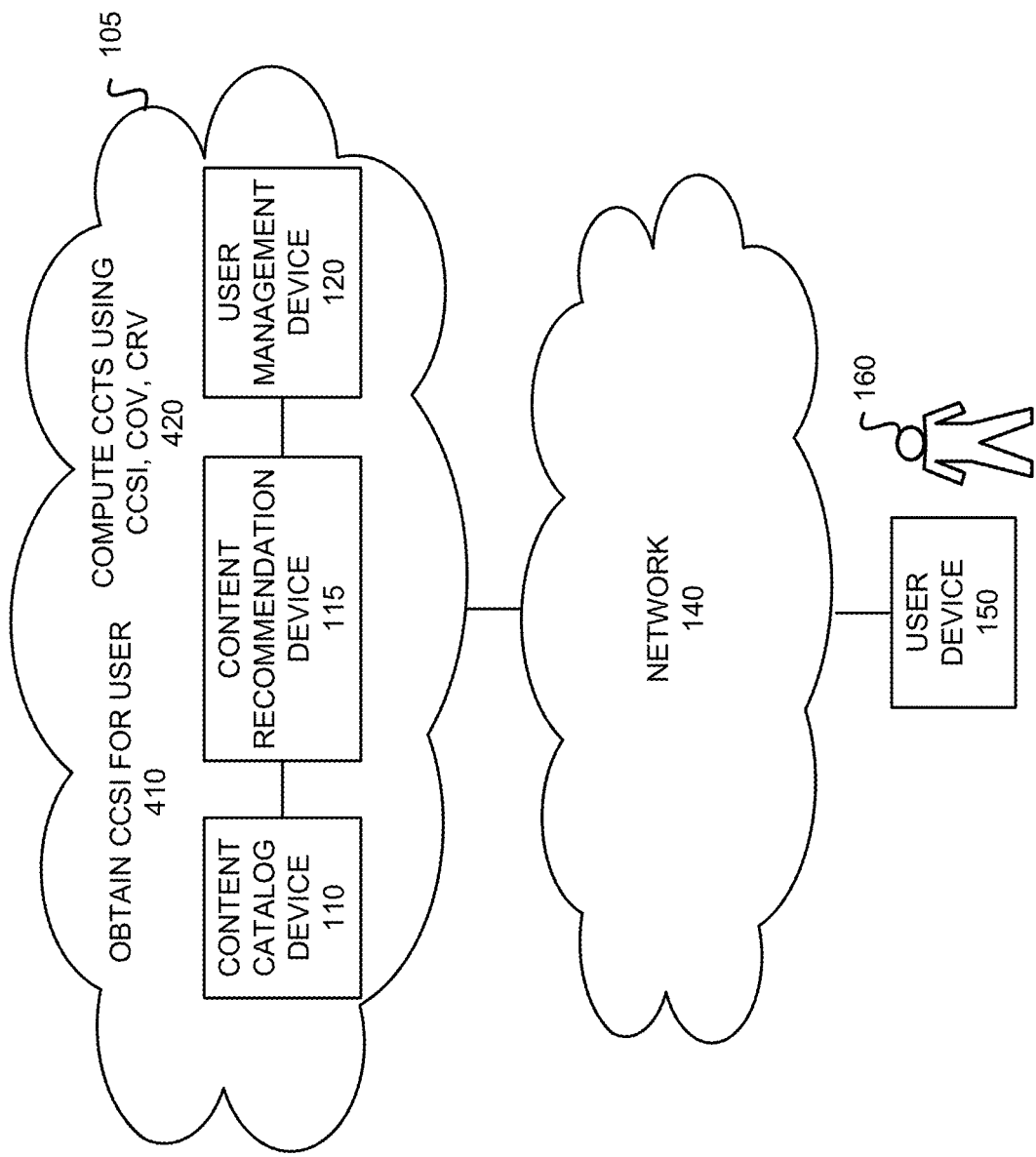

Referring to FIG. 4, content recommendation device 115 may collect and analyze content title selection data to learn user 160's CCSI 410, which is a measure of cost sensitivities and content sensitivities, relative to the cost sensitivities and content sensitivities determined for other users. Content recommendation device 115 may use learning logic, including machine learning algorithms, such as Bayesian statistics and/or models, to analyze user inputs and rules (e.g., stored in policies and procedures), to generate the CCSI to be a normalized value between 0.0 and 1.0, where 0.0 is totally price sensitive and 1.0 is totally content sensitive and 0.5 is equally price sensitive and content sensitive, for example. Machine learning logic may also generate, for a single user 160, multiple CCSI's that differ per content genre, time of day, day of week, and/or time of year, etc., as described in detail below.

Referring still to FIG. 4, content recommendation device 115 may calculate CCTS's for the user for each content title using the CCSI values, CRV, and COV 420, for example, based on expression (1) above. As discussed above, in one embodiment, the CCTS values may range from −1.0 to 1.0, for example, when the CCSI values, the CRV, and the COV are normalized values ranging from 0.0 to 1.0. Content recommendation device 115 may compare the PCTs to identify the top k content titles based on the relative CCTS.

Figure 5:
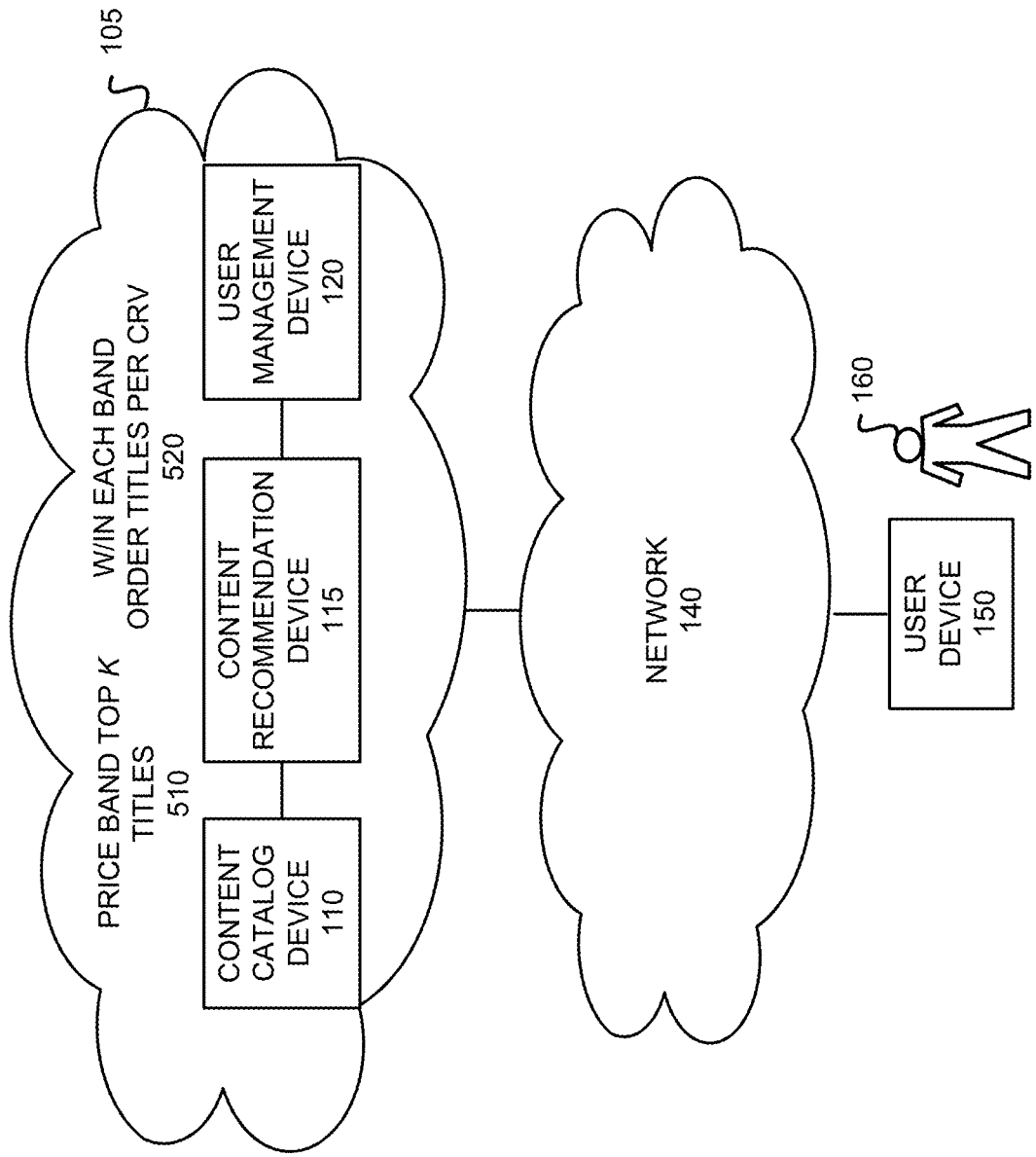

Referring to FIG. 5, content recommendation device 115 may band together the titles having the highest CCTS into n cost bands 510, where n is the number of rows in an n×m grid array G to be populated with the banded content titles. In one embodiment, the number of titles in each band must be equal to or greater than n. Still referring to FIG. 5, content recommendation device 115 may order the titles in each cost band according to the associated CRV 520. In one example, the titles may be ranked in order of descending CRVs within each cost band. The cost bands may be clusters of similarly-priced titles, for example.

Figure 6A:
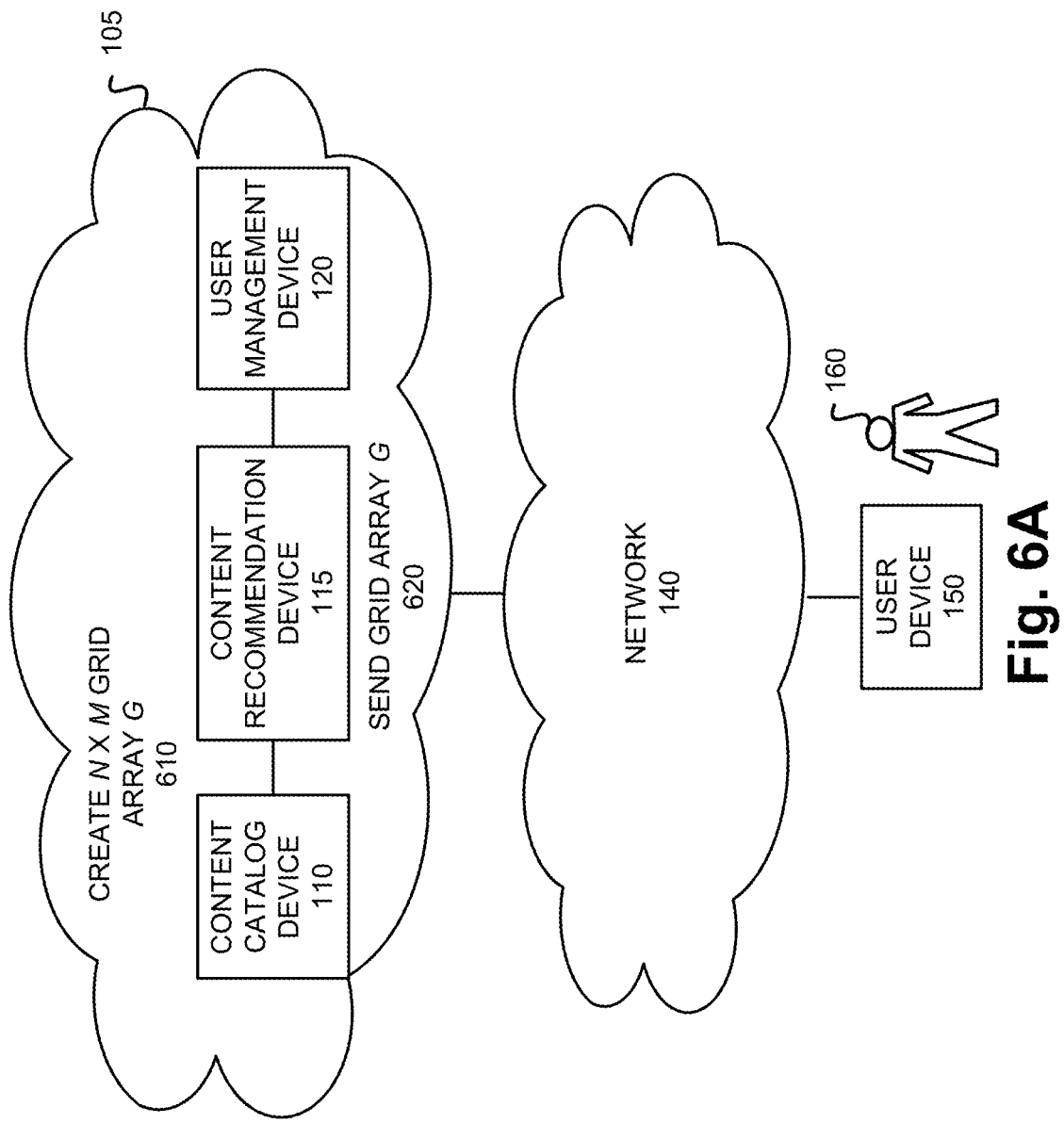
Figure 6B:
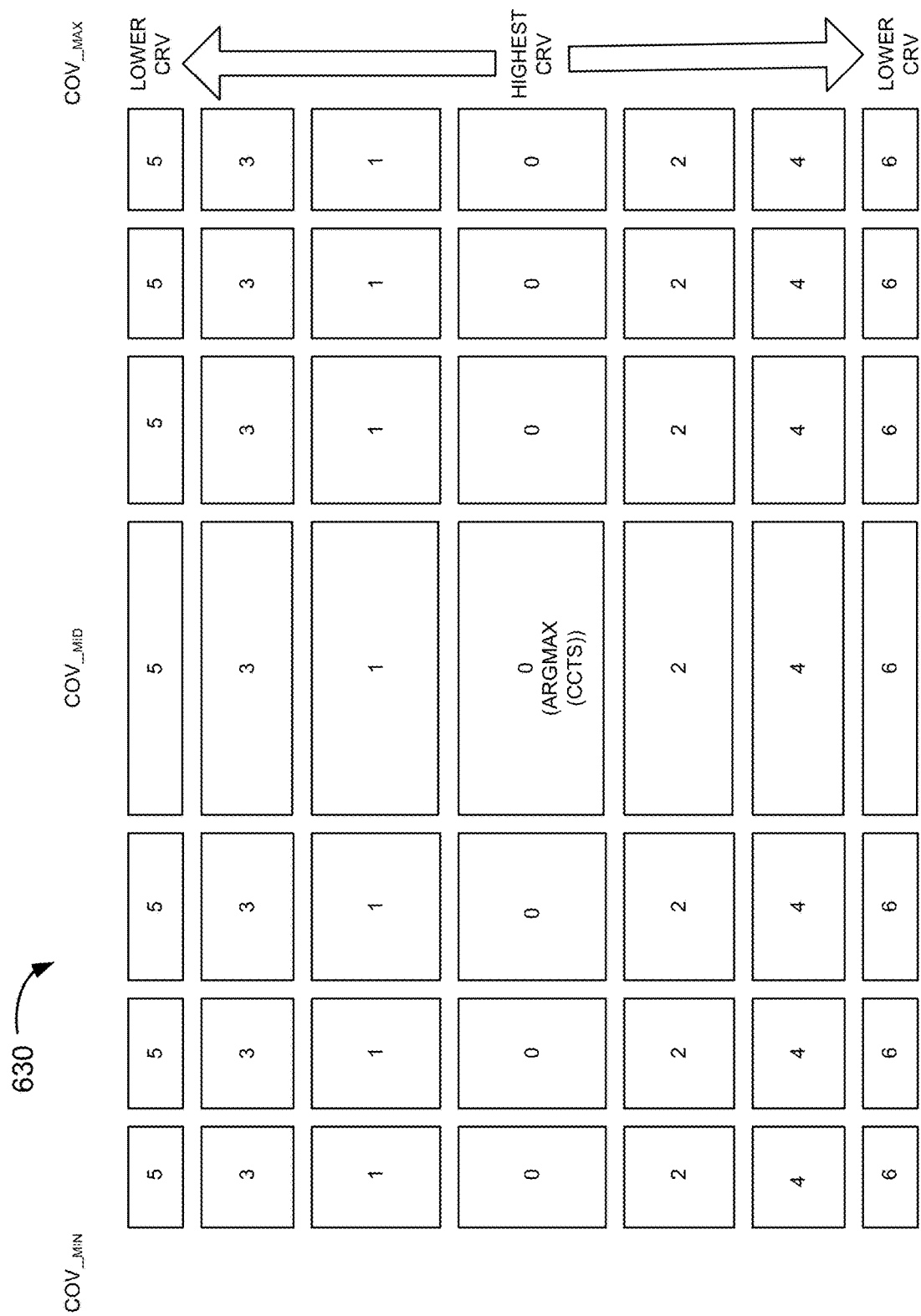
FIG. 6B is a diagram illustrating an exemplary grid array of titles.

Referring to FIG. 6A, content recommendation device 115 may create an n×m grid array G 610. In one embodiment, the titles may be represented as tiles in the grid array G with text and/or graphics, a link to a trailer, cost information, etc., that correspond to the content titles. As shown in FIG. 6B, content recommendation device 115 may order the titles into a personalized content interface 630 according to an algorithm that generally centers the titles (e.g., along an x-axis) around titles having a mid-range COV, and centers the titles (e.g., along a y-axis) around titles having the highest COV. In one embodiment, the tiles may be of varying sizes based on their location in grid array G, and/or have other visual affects applied with respect to color, brightness, etc. Content recommendation device 115 may configure the dimensions of grid array G based on one or multiple characteristics of user device 150.

Referring again to FIG. 6A, content recommendation device 115 provides the grid array G via network 140, to user device 150. For example, content recommendation device 115 may send grid array G, using any communication protocol, in response to a request from user device 150, for available content titles. For example, user 160 may be operating user device 150 to search available content titles.

As previously described, the personalized content recommendation of content titles may be iterative. For example, COVs may be updated/revised substantially continuously based on dynamic pricing models, and CRVs may be updated/revised substantially continuously based on user 160 content spending, selection, and/or viewing patterns. According to other exemplary embodiments, the process described and illustrated in FIGS. 3-6 may include additional operations, fewer operations, and/or different operations.

FIG. 7 is a diagram illustrating exemplary components of a device 700 that may be included in one or more of the devices described herein. For example, device 700 may correspond to components included in network devices of content network 105 and user device 150. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to network devices of content network 105, software 720 may include an application that, when executed by processor 710, provides the functions of the personalized content recommendation interface, as described herein. Software 720 may also include firmware, middleware, microcode, hardware description language (HDL), and/or other form of instruction. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
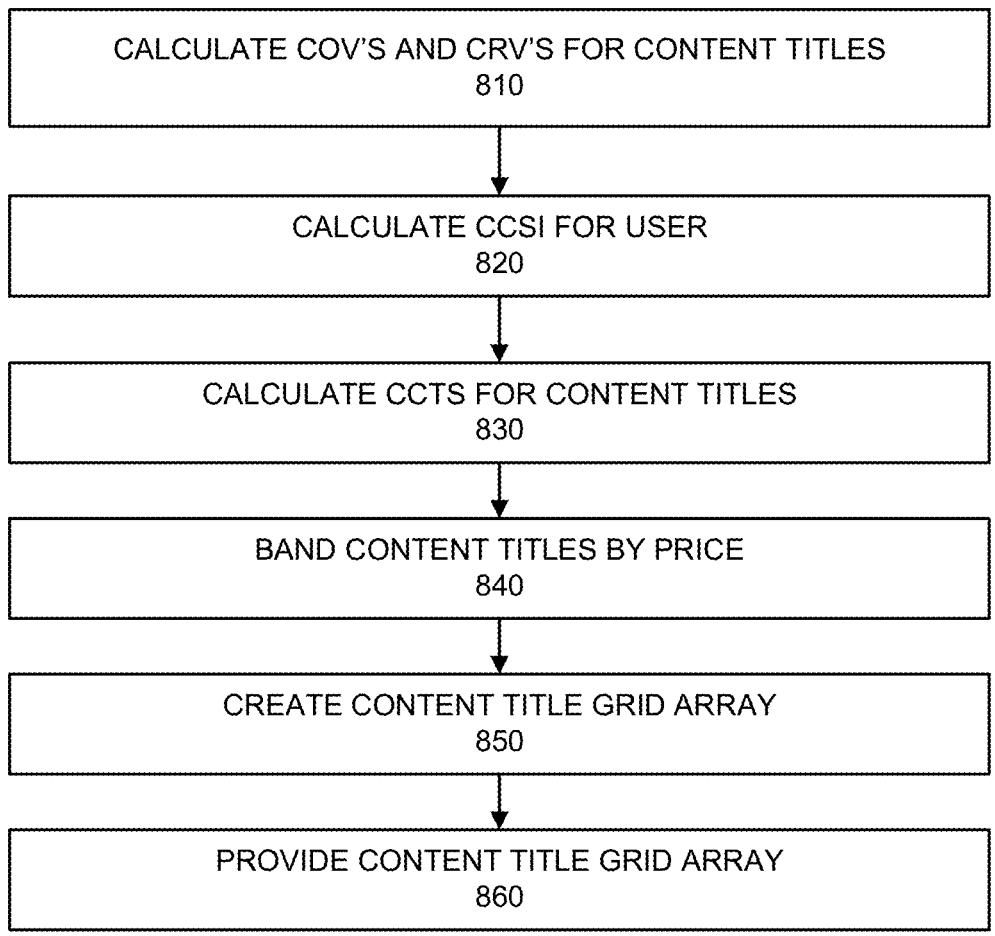
FIG. 8 is a flow diagram illustrating an exemplary process of an exemplary embodiment of the personalized content recommendation interface.

FIG. 8 is a flow diagram illustrating an exemplary process 800 of an exemplary embodiment of the personalized content recommendation interface based on users' sensitivity to content price and content relevance. Process 800 is directed to a process previously described with respect to FIGS. 2-7, as well as elsewhere in this description, in which the personalized content recommendation interface is provided. According to an exemplary embodiment, a network device (e.g., recommendation device 115) performs steps of process 800. For example, processor 710 executes software 720 to perform the steps illustrated in FIG. 8 and described herein.

According to an exemplary process 800 shown in FIG. 8, it may be assumed that user 160 associated with user device 150 has an account for the content service of content network 105. User 160 may access the content service via user device 150, for example, a set-top box, and process 800 may be invoked based on user login information. A personalized content recommendation interface may be generated according to blocks 810-860.

Referring to FIG. 8, in block 810, content recommendation device 115 may, using user profile information and/or content metadata information, calculate a COV and a CRV with respect to user 160 for content titles cataloged in one or multiple databases. For example, content recommendation device 115 may use content metadata from one or multiple catalogs and user profile information regarding time-of-day/day-of-week viewing behavior, genre preferences, selection history, etc., to determine CRVs corresponding to individual content titles. According to an exemplary implementation, content recommendation device 115 may use dynamic pricing information from one or multiple content providers and user profile information to determine COVs for individual content titles.

In block 820 content recommendation device 115 may compute a CCSI value for user 160, which is a normalized value between 0.0 and 1.0, where a value of 0.0 corresponds to user 160 being totally cost sensitive, a value of 1.0 corresponds to user 160 being totally content sensitive, and a value of 0.5 corresponds to user 160 being equally cost sensitive and content sensitive, for example. Other value-to-sensitivity correspondences may be used.

In block 830, content recommendation device 115 may use the CRV, COV, and CCSI to optimize a CCTS for a title with respect to a user, by calculating the CCTS according to the exemplary expression (1) above. According to such an exemplary implementation, where the parameters COV, CRV, and β are normalized values in a real number range (e.g., [0.0 . . . 1.0]), the CCTS values can range from −1.0 to 1.0.

In block 840, content recommendation device 115 may band together k titles having the highest CCTS into m bands, where m is the number of columns in an n×m grid array G to be populated with the banded titles. In one embodiment, content recommendation device 115 may order the titles within each band ranked in order of descending CRV.

In block 850, content recommendation device 115 may create an n×m grid array G. According to an exemplary implementation, assigning the titles to the grid G may be implemented based on the following exemplary algorithm:

```
mid = (n − 1) / 2
for "i" in range (0 to n − 1) {
    q = 0.
    for "j" in range (0 to mid) {
        G[i, mid + j] = B[i, q]
        increment q by 1
        if(j = 0) {
            G[I, mid − j] = B[i, q+1]
            increment q by 1
``` where "i" is the price band, "j" is the distance from the center row (i.e., j=0), and "q" is the relevance ranking within the price band i.

FIG. 9 is an exemplary personalized content recommendation interface 900 that may be generated using the above algorithm. As illustrated, content title grid array G may be a 7×7 grid of tiles containing content title information (e.g., metadata) for presentation of titles for review and selection by user 160 via, for example, a display device associated with user device 150, e.g., a set-top box. Content titles considered to be most relevant occupy the middle row (i.e., j=0), while titles priced in a mid-range may occupy the center column (i.e., i=3). Coordinate information (i.e., i, j, q) may be hidden metadata. The tiles may include less information than what is shown and/or other information. Some titles may indicate multiple cost options that may be available to user 160 (e.g., a reduced charge versus free with sponsored ads, etc.).

In block 860, personalized content recommendation interface 900 may be presented via user device 150 for searching and selection based on input from user 160. For example, content recommendation device 115 may provide the grid array information to user device 150 and user device 150 may determine its dimensions (i.e., n×m) based on characteristics of user device 150, for example. According to an exemplary implementation, when user input (e.g., scrolling) is received via the personalized content recommendation interface 900 that is beyond the outermost tiles, personalized content recommendation interface 900 may generate, using the metadata for the top k titles, additional rows and/or columns of titles and/or re-center the grid array G. In another embodiment, when a user input is received for a content title that is not at the center of grid array G, grid array G may be reconfigured such that the content title is repositioned at the center of grid array G, and grid array G is repopulated with a subset of the banded content titles to fill the n×m grid array G.

Although FIG. 8 illustrates an exemplary process 800 of personalized content recommendation interface 900, according to other embodiments, process 800 may include additional operations, fewer operations, and/or different operations than those illustrated in FIG. 8 and described herein. Process 800 may be iteratively performed. For example, subsequent to the presentment of the search result, user 160 may additionally enter search terms (e.g., times and/or days for viewing). Process 800 may continue to any block in process 800. Process 800 may end when user 160 exits the content service, selects content to view, purchase, or download, and/or other user input (or lack thereof) that indicates a search process has ended.

According to various exemplary embodiments, a parameter of personalized content recommendation interface 900 may be configured by an administrator of the service provider or by the user (e.g., user 160). For example, the parameter may include instructions to use a logarithmic, linear, or non-linear price scale when price banding to evenly distribute the titles within n (or m) cost bands.

In still other embodiments, any of the information described herein (e.g. COV, CRV, CCTI, CCTS, etc.) may be used to select and/or generate ad information to present to a user in connection with and/or unrelated to the presentation of a content recommendation that is configured using the same information. In still other embodiments, the information described herein may be used to automatically select and add one or more content titles to a user's "shopping cart" of items for rent/purchase. In one implementation, automatic selection and adding of content items to a shopping cart may be based on a threshold confidence level with respect to one or more of the user's COV, CRV, CCTI, and CCTS data. In one embodiment, the automatic selection and/or adding may be performed based on the user's consent to this feature.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a device. A non-transitory storage medium includes one or more of the storage mediums described in relation to memory/storage 715.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   determining, by a network device and based on media content selection activity of a user with respect to a media content inventory, the user's sensitivity to a cost to the user for accessing media content and the user's sensitivity to a relevance of the media content;
   generating a single, user sensitivity value that identifies an inverse relationship between the user's sensitivity to the cost and the user's sensitivity to the relevance;
   assigning, by the network device, a cost value and a relevance value to respective media content items in the media content inventory, wherein the cost values are based on user-specific content cost information associated with one or more media content providers and the relevance values are based on user-specific content relevancy information associated with the respective media content items;
   ranking, by the network device, the media content items based on:
      the user sensitivity value relative to the cost values for the respective media content items, and
      the user sensitivity value relative to the relevance values for the respective media content items; and
   presenting, via a personalized media content recommendation interface, an ordering of the media content items based on the ranking.

2. The method of claim 1, wherein the determining is performed after a media content search and recommendation session is initiated based on receipt of a search query from a user device associated with the user.

3. The method of claim 2, further comprising:
   terminating the media content search and recommendation session based on a failure by the user to select any of the presented media content items.

4. The method of claim 3, further comprising:
   storing, in a user profile associated with the user, an amount of time between the initiating and the terminating of the media content search and recommendation session.

5. The method of claim 1, wherein the user's media content selection activity includes non-selection of a portion of the media content inventory previously recommended to the user.

6. The method of claim 1, further comprising revising the user sensitivity value depending on a time of day.

7. The method of claim 1, wherein the user-specific cost information and the user-specific relevancy information are stored in metadata for each of the media content items.

8. A device comprising:
   a communication interface;
   a memory, wherein the memory stores instructions; and
   a processor, wherein the processor executes the instructions to:

determine, based on media content selection activity of a user with respect to a media content inventory, the user's sensitivity to a cost of the media content and the user's sensitivity to a relevance of the media content, generate a single, user sensitivity value that identifies an inverse relationship between the user's sensitivity to the cost and the user's sensitivity to the relevance, assign a cost value and a relevance value to respective media content items in the media content inventory, wherein the cost values are based on user-specific content cost information associated with one or more media content providers and the relevance values are based on user-specific content relevancy information associated with the respective media content items, rank the media content items based on:
    the user sensitivity value relative to the cost values for the respective media content items, and
    the user sensitivity value relative to the relevance values for the respective media content items; and present, via a personalized media content recommendation interface, an ordering of the media content items based on the ranking.

9. The device of claim 8, wherein the processor further executes the instructions to:
initiate a media content search and recommendation session based on a search query received from a user device associated with the user.

10. The device of claim 9, wherein the processor further executes the instructions to:
terminate the media content search and recommendation session based on a failure by the user to select any of the presented media content items.

11. The device of claim 10, wherein the processor further executes the instructions to:
store, in a user profile associated with the user, an amount of time between the initiating and the terminating of the media content search and recommendation session.

12. The device of claim 8, wherein the user's media content selection activity includes non-selection of a portion of the media content inventory previously recommended to the user.

13. The device of claim 8, wherein the processor further executes the instructions to:
revise the user sensitivity value depending on a time of day.

14. The device of claim 8, wherein the user-specific cost information and the user-specific relevancy information are stored in metadata for each of the media content items.

15. A non-transitory, computer-readable storage medium storing instructions executable by a processor of a device, which when executed cause the device to:
determine, based on media content selection activity of a user with respect to a media content inventory, the user's sensitivity to a cost of the media content and the user's sensitivity to a relevance of the media content, generate a single, user sensitivity value that identifies an inverse relationship between the user's sensitivity to the cost and the user's sensitivity to the relevance, assign a cost value and a relevance value to respective media content items in the media content inventory, wherein the cost values are based on user-specific content cost information associated with one or more media content providers and the relevance values are based on user-specific content relevancy information associated with the respective media content items, rank the media content items based on:
    the user sensitivity value relative to the cost values for the respective media content items, and
    the user sensitivity value relative to the relevance values for the respective media content items; and present, via a personalized media content recommendation interface, an ordering of the media content items based on the ranking.

16. The non-transitory, computer-readable storage medium of claim 15, wherein the instructions further include instructions executable by the processor of the device, which when executed cause the device to:
initiate a media content search and recommendation session based on a search query received from a user device associated with the user.

17. The non-transitory, computer-readable storage medium of claim 16, wherein the instructions further include instructions executable by the processor of the device, which when executed cause the device to:
terminate the media content search and recommendation session based on a failure by the user to select any of the presented media content items.

18. The non-transitory, computer-readable storage medium of claim 17, wherein the instructions further include instructions executable by the processor of the device, which when executed cause the device to:
store, in a user profile associated with the user, an amount of time between the initiating and the terminating of the media content search and recommendation session.

19. The non-transitory, computer-readable storage medium of claim 15, wherein the user's media content selection activity includes non-selection of a portion of the media content inventory previously recommended to the user.

20. The non-transitory, computer-readable storage medium of claim 15, wherein the instructions further include instructions executable by the processor of the device, which when executed cause the device to:
revise the user sensitivity value depending on a time of day.

* * * * *